(12) United States Patent
Min et al.

(10) Patent No.: US 7,833,925 B2
(45) Date of Patent: Nov. 16, 2010

(54) METHOD OF PREPARING METAL NANOPARTICLES

(75) Inventors: Myoung-Ki Min, Suwon-si (KR); Geun-Seok Chai, Suwon-si (KR); Soon-Ki Kang, Suwon-si (KR)

(73) Assignees: Samsung SDI Co., Ltd., Gongse-dong, Giheung-gu, Yongin-si, Gyeonggi-do (KR); Korea Atomic Energy Research Institute, Daejeon-Si (KR)

( * ) Notice: Subject to any disclaimer, the term of this patent is extended or adjusted under 35 U.S.C. 154(b) by 332 days.

(21) Appl. No.: 11/976,091

(22) Filed: Oct. 19, 2007

(65) Prior Publication Data

US 2008/0223712 A1    Sep. 18, 2008

(30) Foreign Application Priority Data

Nov. 1, 2006    (KR) .................... 10-2006-0107331

(51) Int. Cl.
*B01J 37/34*    (2006.01)
*B01J 19/12*    (2006.01)

(52) U.S. Cl. ................ 502/5; 502/185; 502/339; 502/522; 502/101; 204/157.4; 204/157.44; 204/157.15; 429/523; 429/524; 429/527; 429/529; 429/530; 429/531; 429/532

(58) Field of Classification Search ............... 502/5, 502/185, 339, 522, 101; 204/157.4, 157.44, 204/157.15; 429/40, 41, 42, 43, 44, 523, 429/524, 527, 529, 530, 531, 532
See application file for complete search history.

(56) References Cited

U.S. PATENT DOCUMENTS

| | | | |
|---|---|---|---|
| 2004/0042955 A1* | 3/2004 | Srinivas | 423/460 |
| 2004/0109816 A1* | 6/2004 | Srinivas et al. | 423/449.2 |
| 2004/0110051 A1* | 6/2004 | Srinivas | 429/33 |
| 2004/0110052 A1* | 6/2004 | Srinivas | 429/33 |
| 2004/0144961 A1* | 7/2004 | Srinivas | 252/500 |
| 2004/0166401 A1* | 8/2004 | Srinivas | 429/44 |
| 2004/0169165 A1* | 9/2004 | Srinivas | 252/511 |
| 2008/0096093 A1* | 4/2008 | Jang et al. | 429/42 |

FOREIGN PATENT DOCUMENTS

| | | |
|---|---|---|
| KR | 10-2003-0015593 | 2/2003 |
| KR | 10-2005-0088675 | 9/2005 |

* cited by examiner

*Primary Examiner*—Elizabeth D Wood
(74) *Attorney, Agent, or Firm*—Robert E. Bushnell, Esq.

(57) ABSTRACT

A method of manufacturing metal nanoparticles by mixing a metal precursor with a solvent to prepare a mixed solution, and radiating the mixed solution with an ion beam to reduce the metal precursor and produce the metal nanoparticles. In addition, when metal nanoparticles are prepared by using an ion beam, uniform-sized metal nanoparticles can be mass produced.

21 Claims, 5 Drawing Sheets

US 7,833,925 B2

METHOD OF PREPARING METAL NANOPARTICLES

CLAIM OF PRIORITY

This application makes reference to, incorporates the same herein, and claims all benefits accruing under 35 U.S.C. §119 from an application for METHOD OF PREPARING METAL NANOPARTICLES earlier filed in the Korean Intellectual Property Office on 1 Nov. 2006 and there duly assigned Serial No. 10-2006-0107331.

BACKGROUND OF THE INVENTION

1. Field of the Invention

The present invention relates to a method of preparing metal nanoparticles. More particularly, the present invention relates to a simple process of preparing metal nanoparticles on a large scale and that can be used as a fuel cell catalyst.

2. Description of the Related Art

A fuel cell is a power generation system for producing electrical energy through an electrochemical redox reaction of an oxidant and hydrogen in a hydrocarbon-based material such as methanol, ethanol, and natural gas. Such a fuel cell is a clean energy source that can replace fossil fuels. The fuel cell includes a stack composed of unit cells, and produces various ranges of power output. Since a fuel cell has a four to ten times higher energy density than a small lithium battery, the fuel cell has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel. The polymer electrolyte fuel cell has an advantage of high energy density, but it also has problems in that the hydrogen gas must be carefully handled and that accessory facilities, such as a fuel reforming processor for reforming methane or methanol, natural gas, and the like, are needed in order to produce hydrogen as the fuel gas.

On the contrary, a direct oxidation fuel cell has a lower energy density than that of the polymer electrolyte fuel cell, but it has advantages of easy handling of a fuel and is capable of being operated at room temperature due to its low operation temperature, and there is no need for additional fuel reforming processors.

In the above fuel cells, the stack that generates electricity substantially includes several to scores of unit cells stacked in multi-layers, and each unit cell is formed of a membrane-electrode assembly (MEA) and a separator (also referred to as a bipolar plate). The membrane-electrode assembly has an anode and a cathode disposed on each other with an electrolyte membrane arranged between them.

In the above fuel cells, a fuel is supplied to the anode and is adsorbed on catalysts of the anode, and the fuel is oxidized to produce protons and electrons. The electrons are transferred into the cathode via an external circuit, and the protons are also transferred into the cathode through the polymer electrolyte membrane. In addition, an oxidant is supplied to the cathode, and then the oxidant, protons, and electrons are reacted on catalysts of the cathode to produce electricity along with water.

The anode catalyst or the cathode catalyst can include various metal-based catalysts including a platinum-based metal. Recently, the metal-based catalysts have been known to include a nanoparticle shape to improve activity. In addition, the metal nanoparticles can be applied to various fields such as catalysts for fuel cell, solar cell or purification, functional particles such as nano silver, or nano gold, conductive ink for manufacturing electrodes of display, functional additives for adhesives, and the like.

Conventional methods of manufacturing metal nanoparticles include a chemical method and an irradiation method. The chemical method is the most popular, in which a metal precursor is reduced by using a reducing agent such as $NaBH_4$, hydrazine, ethylene glycol, $H_2SO_3$, $LiAlH_4$, and the like. However, it is not good for mass production, because it needs to be optimized by several factors such as temperature, pH, reaction speed (time) of a metal precursor, and a reactant.

In addition, the irradiation method is performed by using light rather than a reducing agent, in general, gamma ray, UV, and the like. In general, the gamma ray is the most popular among these, but it has a limit such as formation of an alloy or deterioration of reactivity when manufacturing metal nanoparticles.

SUMMARY OF THE INVENTION

One embodiment of the present invention provides a method of mass-producing metal nanoparticles via a simple process.

According to an embodiment of the present invention, there is provided a method of making metal nanoparticles, including preparing a mixed solution by mixing a metal precursor and a solvent, producing the metal nanoparticles by reducing the metal precursor by radiating the mixed solution with an ion beam. The ion beam can be radiated by accelerating ions to 10 MeV to 100 MeV with a current of 100 nA to 50 µA. The ions can instead be accelerated to 20 to 70 MeV. The ions can instead be accelerated to 30 to 60 MeV. The ions can be radiated with a current of 5000 nA to 10 µA. The ions can instead be radiated with a current of 800 nA to 3 µA. The ions can be hydrogen ions. The solvent can be one of water, alcohol, and combinations thereof. The alcohol can be one of isopropyl alcohol, methanol, ethanol, n-propyl alcohol, butanol, glycerol, ethylene glycol, and combinations thereof. The solvent and the alcohol can be mixed in a volume ratio of 995 to 250:5 to 750. The solvent and the alcohol can be mixed in a volume ratio of 970 to 500:30 to 500. The mixed solution can be a metal precursor in a concentration of 30 mM to 1 mM. The mixed solution can instead be a metal precursor in a concentration of 20 mM to 5 mM. The mixed solution can also includes a carrier. The mixed solution can also include a dispersing agent. The dispersing agent can be one of tetrahydrofuran, glycerol, ethylene glycol, and combinations thereof. The metal can be one of platinum, iron, cobalt, nickel, and combinations thereof. The metal precursor can be one of $H_2PtCl_6$, $H_6Cl_2N_2Pt$, $PtCl_2$, $PtBr_2$, platinum acetylacetonate, $K_2[PtCl_4]$, $H_2Pt(OH)_6$, $Pt(NO_3)_2$, $[Pt(NH_3)_4]Cl_2$, $[Pt(NH_3)_4](HCO_3)_2$, $[Pt(NH_3)_4](OAc)_2$, $(NH_4)_2PtBr_6$, $(NH_3)_2PtCl_6$, and hydrates and combination thereof. The mixed solution can be heated to 20 to 80° C. prior to being radiated with ions. The mixed solution can instead be heated to 50 to 70° C. prior to said radiating with ions. The metal nanoparticles can be a catalyst. The metal nanoparticles can be a fuel cell catalyst.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
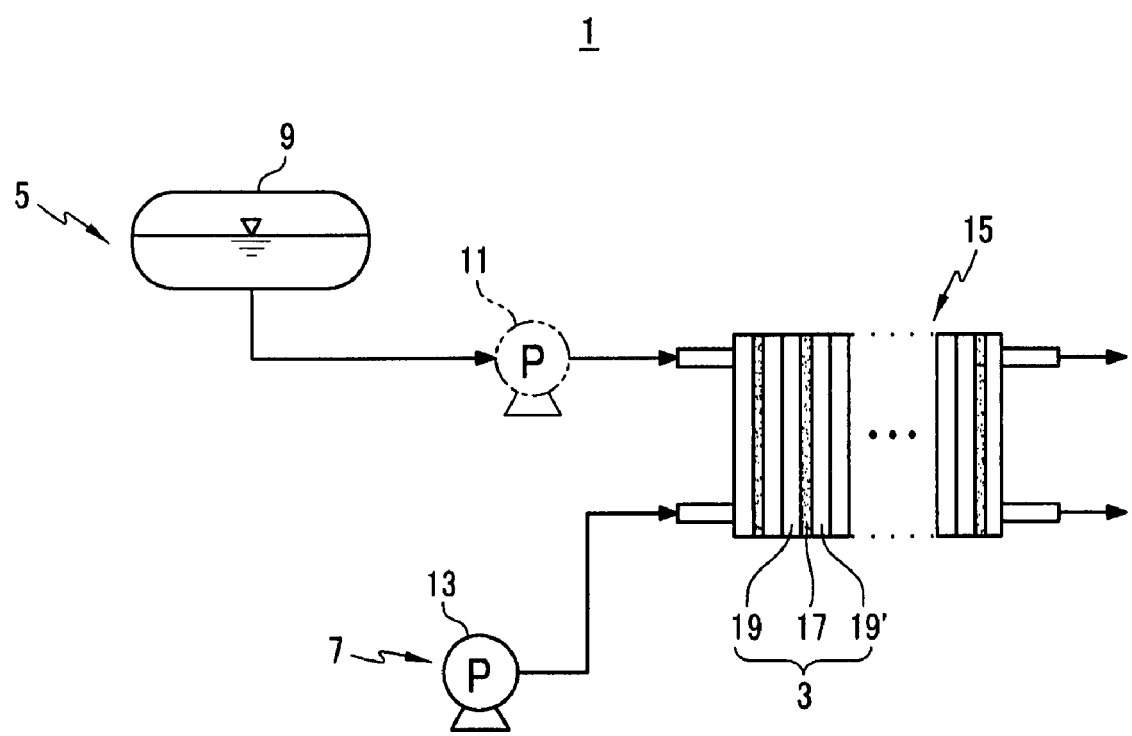
FIG. 1 is a view of a structure of a fuel cell system according to one embodiment of the present invention.

The present invention provides a manufacturing method of metal nanoparticles. According to an embodiment of the present invention, metal nanoparticles are prepared by first mixing a metal precursor and a solvent to prepare a mixed solution. The solvent has no particular limit, but it can be selected from the group consisting of water, alcohol, and combinations thereof. However, a mixed solvent of water and polyhydric alcohol can be used according to another embodiment of the present invention.

Herein, the alcohol plays a role of a scavenger, and thereby prevents electrons generated by an ion beam or electrons and radicals generated from hydrated water when the ion beam impacts the water from reacting with ions or radicals generated by the ion beam, before the electrons generated by the ion beam or the electrons and radicals generated from the hydrated water cause a reduction of the metal precursor. In addition, when polyhydric alcohol is used among the various alcohols, it also can play a role of a dispersing agent and efficiently disperse a metal precursor, thereby uniformly promoting the entire reaction. The alcohol can be one or a combination of isopropyl alcohol, methanol, ethanol, n-propyl alcohol, butanol, glycerol, ethylene glycol, and combinations thereof.

The solvent and alcohols can be mixed in a volume ratio of 995 to 250:5 to 750. In one embodiment, the solvent and alcohols can be mixed in a volume ratio of 970 to 500:30 to 500. In other embodiments, the alcohols can be mixed with water in a volume ratio of 5, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, or 750 parts by volume based on 995 to 250 parts by volume of the solvent.

When the alcohol is used in an amount of less than 5 parts by volume based on 995 parts by volume of a solvent, it cannot properly play a role of a scavenger. On the other hand, when used in an amount of more than 750 parts by volume, a metal precursor can not be reduced.

In the mixed solution, a metal precursor can be included in a concentration of 30 to 1 mM, but according to another embodiment, it can be included in a concentration of 20 to 5 mM. When the metal precursor is included in a concentration of more than 30 mM, so much is added that is aggregates together, resulting in formation of excessively large metal nanoparticles. On the other hand, when it is included in a concentration of less than 1 mM, the solvent is excessively included so that the reaction time can become too long and the prepared metal nanoparticles can be difficult to separate.

The metal precursor can include a metal such as platinum, iron, cobalt, or nickel, but is not limited thereto. The metal precursor can be one or more of $H_2PtCl_6$, $H_6Cl_2N_2Pt$, $PtCl_2$, $PtBr_2$, platinum acetylacetonate, $K_2[PtCl_4]$, $H_2Pt(OH)_6$, $Pt(NO_3)_2$, $[Pt(NH_3)_4]Cl_2$, $[Pt(NH_3)_4](HCO_3)_2$, $[Pt(NH_3)_4](OAc)_2$, $(NH_4)_2PtBr_6$, $(NH_3)_2PtCl_6$, hydrates thereof, and combinations thereof, but is not limited thereto.

In addition, when a fuel cell catalyst is prepared in the manufacturing method of metal nanoparticles, the metal precursor can be a platinum precursor. Furthermore, the platinum precursor can be used with a transition element precursor to prepare an alloy catalyst with more than 2 platinum-transition elements or 2 to 4 platinum-transition elements. The transition elements can include V, Cr, Mn, Fe, Co, Ni, Cu, Ru, Ir, W, Mo, or Rh. In general, a fuel cell includes the same catalyst for both the cathode and the anode. However, a cathode catalyst of the present invention can include V, Cr, Mn, Fe, Co, Ni, or Cu as a transition element used with platinum, while an anode catalyst can include Ru, Ir, W, Mo, or Rh. The precursor can include any compound such as a halide, a nitrate, a hydrochloride, a sulfate, an amine group, and the like. However, according to another embodiment, a halide among these compounds can be used.

The mixed solution can be prepared by further including a carrier. The carrier can include a carbon-based material such as graphite, denka black, ketjen black, acetylene black, carbon nanotubes, carbon nanofibers, carbon nanowire, carbon nanoballs, activated carbon, or the like, and an inorganic particulate material such as alumina, silica, zirconia, titania, or the like. However, the carrier can in general include a carbon-based material.

In addition, the mixed solution can be prepared by further including a dispersing agent to uniformly disperse a metal precursor. The dispersing agent can be one or more of tetrahydrofuran, glycerol, ethylene glycol, and combinations thereof. The dispersing agent is used in an amount of 10 to 60 parts by weight based on 100 parts by weight of a mixed solution.

When the dispersing agent is included, it can smoothly disperse a metal precursor and a carrier, resulting in preparation of small metal nanoparticles. When the dispersing agent is included in an amount of less than 10 parts by weight based on 100 parts by weight of a mixed solution, the metal nanoparticles can be too large, while when included in an amount of more than 60 parts by weight, the metal nanoparticles can be so small and dispersed among dispersing agents that they cannot be filtrated. Accordingly, the metal nanoparticles can be difficult to obtain as a powder but easy to obtain as an agglomeration.

Then, the mixed solution is subjected to radiation of an ion beam to reduce the metal precursor, producing metal nanoparticles. When the ion beam is radiated to the mixed solution, the mixed solution is reduced from neutrality to a metal due to the radiated ions. However, an ordinary ion beam cannot reduce a metal precursor and thereby fails in preparing metal nanoparticles. The reason is that ordinary ion beams mainly have too low an energy and too low a transmission rate.

Therefore, the present invention provides a method of producing metal nanoparticles with an ion beam by accelerating ions to 10 MeV to 100 MeV to increase the transmission rate of the ion beam, and then radiating the accelerated ions with a current of 100 nA to 50 μA to raise the reaction speed. This range of 10 MeV to 100 MeV is much higher than that of ordinary ion beams. In addition, since the metal nanoparticles can be produced at a controlled reaction speed with the ion beam, metal nanoparticles with a uniform size can be mass produced.

The ions can be accelerated at 10 to 100 MeV. According to another embodiment of the present invention, they can be accelerated at 20 to 70 MeV, or they can be accelerated at 30 to 60 MeV according to still another embodiment. Accordingly, the ions can be all accelerated at 10 MeV, 20 MeV, 30 MeV, 40 MeV, 50 MeV, 60 MeV, 70 MeV, 80 MeV, 90 MeV, or 100 MeV.

In addition, the ions can be radiated with a current of 100 nA to 50 µA. They can also be radiated with a current of 500 nA to 10 µA according to another embodiment of the present invention, or can be radiated with a current of 800 nA to 3 µA according to still another embodiment. Accordingly, the ions can be all radiated with a current of 100 nA, 500 nA, 1 µA, 5 µA, 10 µA, 20 µA, 30 µA, 40 µA, or 50 µA.

The radiation time of the ions can be controlled depending on the amount of the mixed solution. The greater the amount of mixed solution that is included, the longer the ions need to be radiated.

The ions can be hydrogen ions. When reduction of a metal is complete by using the hydrogen ions and leaving no reactant for reduction, the hydrogen ions turn into hydrogen gas.

Furthermore, the ions can be radiated after heating to 20 to 80° C. However, according to another embodiment of the present invention, they can be radiated after heating a mixed solution to 50 to 70° C. When the mixed solution is radiated after heating to a proper temperature, a metal can be reduced at a faster speed.

On the other hand, metal nanoparticles produced according to the method of the present invention can be used as a catalyst, and particularly as a fuel cell catalyst. In addition, the metal nanoparticles can be used for either or both of the cathode and the anode of a fuel cell. In general, the anode and the cathode of a fuel cell are not distinguished depending on the kinds of catalyst, which can be easily understood to those who work in a related field.

The electrodes including the above metal nanoparticles as a catalyst includes an electrode substrate and a catalyst layer. The catalyst layer can further include a binder resin to improve adherence to the polymer electrolyte membrane and the proton transferring property.

The binder resin can be a proton conductive polymer resin having a cation exchange group, such as a sulfonic acid group, a carboxylic acid group, a phosphoric acid group, a phosphonic acid group, and derivatives thereof at its side chain. Non-limiting examples of the polymer include at least one proton conductive polymer such as perfluoro-based polymers, benzimidazole-based polymers, polyimide-based polymers, polyetherimide-based polymers, polyphenylene-sulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

Hydrogen can be replaced with Na, K, Li, Cs, or tetrabutyl ammonium in a proton conductive group of the proton conductive polymer. When H is substituted by Na in an ion exchange group at the terminal end of the proton conductive group, NaOH is used. When H is replaced with tetrabutyl ammonium, tributyl ammonium hydroxide is used. K, Li, or Cs can also be replaced by using appropriate compounds. A method of substituting H is known in this related art, and thereby is not further described in detail.

The binder resin can be used singularly or as a mixture. Optionally, the binder resin can be used along with a non-conductive polymer to improve adherence between a polymer electrolyte membrane and the catalyst layer. The use amount of the binder resin can be adjusted to its usage purpose.

Non-limiting examples of the non-conductive polymer include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE)), ethylenechlorotrifluoro-ethylene copolymers (ECTFE), polyvinylidene fluoride, polyvinylidene fluoride-hexafluoropropylene copolymers (PVdF-HFP), dodecyl benzene sulfonic acid, sorbitol, and combinations thereof.

The electrode substrate supports the electrode, and provides a path for transferring fuel and an oxidant to the catalyst. In one embodiment, the electrode substrates are formed from a material such as carbon paper, carbon cloth, carbon felt, or a metal cloth (a porous film composed of metal fiber or a metal film disposed on a surface of a cloth composed of polymer fibers). The electrode substrate is not limited thereto.

The electrode substrates can be treated with a fluorine-based resin to be water-repellent to prevent deterioration of diffusion efficiency due to water generated during operation of a fuel cell. The fluorine-based resin can include polytetrafluoroethylene, polyvinylidene fluoride, polyhexafluoro propylene, polyperfluoroalkylvinylether, polyperfluoro sulfonylfluoride alkoxyvinyl ether, fluorinated ethylene propylene, polychlorotrifluoro ethylene, or copolymers thereof, but is not limited thereto.

A microporous layer (MPL) can be added between the aforementioned electrode substrate and catalyst layer to increase reactant diffusion effects. The microporous layer generally includes conductive powders with a certain particle diameter. The conductive material can include, but is not limited to, carbon powder, carbon black, acetylene black, ketjen black, activated carbon, carbon fiber, fullerene, nano-carbon, or combinations thereof. The nano-carbon can include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the conductive substrate. The binder resin can include, but is not limited to, polytetrafluoro ethylene, polyvinylidene fluoride, polyhexafluoro propylene, polyperfluoroalkylvinyl ether, polyperfluoro sulfonylfluoride, alkoxy vinyl ether, polyperfluorosulfonylfluoride, alkoxyvinyl ether, polyvinylalcohol, cellulose acetate, and copolymers thereof. The solvent can include, but is not limited to, an alcohol such as ethanol, isopropylalcohol, n-propylalcohol, butyl alcohol, and so on, water, dimethyl acetamide, dimethyl sulfoxide, N-methylpyrrolidone, tetrahydrofuran, and so on. The coating method can include, but is not limited to, screen printing, spray coating, doctor blade methods, gravure coating, dip coating, silk screening, painting, and so on, depending on the viscosity of the composition.

A membrane-electrode assembly including the electrodes as an anode and a cathode includes a polymer electrolyte membrane between the cathode and anode.

The polymer electrolyte membrane of the membrane-electrode assembly can generally include a proton conductive polymer resin. The proton conductive polymer resin can be a polymer resin having a cation exchange group such as a sulfonic acid group, a carboxylic acid group, a phosphoric acid group, a phosphonic acid group, and derivatives thereof, at its side chain.

Non-limiting examples of the polymer resin include at least one of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In another embodiment, the proton conductive polymer is at least one selected from the group consisting of poly (perfluorosulfonic acid) (NAFION™), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The hydrogen in the proton conductive group of the proton conductive polymer can be substituted with Na, K, Li, Cs, or tetrabutylammonium. When the H in the ionic exchange group of the terminal end of the proton conductive polymer side is substituted with Na or tetrabutylammonium, NaOH or tetrabutylammonium hydroxide can be used, respectively. When the H is substituted with K, Li, or Cs, suitable compounds for the substitutions can be used. Since such a substitution is known to this art, a detailed description thereof is omitted.

A fuel cell system according to one embodiment includes at least one electricity generating element, a fuel supplier, and an oxidant supplier.

The electricity generating element includes a membrane-electrode assembly and a separator (also called a bipolar plate). The membrane-electrode assembly includes a polymer electrolyte membrane, and a cathode and an anode disposed on respective sides of the polymer electrolyte membrane. The electricity generating element generates electricity through oxidation of a fuel and reduction of an oxidant.

The fuel supplier plays a role of supplying a fuel to the electricity generating element, and the oxidant supplier plays a role of supplying an oxidant such as oxygen or air to the electricity generating element.

According to the embodiment of the present invention, the fuel includes hydrogen or a hydrocarbon fuel in gas or liquid form. The hydrocarbon fuel can include methanol, ethanol, propanol, butanol, or natural gas.

FIG. 1 shows a schematic structure of a fuel cell system that will be described in detail with reference to this accompanying drawing as follows. FIG. 1 illustrates a fuel cell system wherein a fuel and an oxidant are provided to the electricity generating element through pumps, but the present invention is not limited to such structures. The fuel cell system of the present invention alternatively includes a structure wherein a fuel and an oxidant are provided in a diffusion manner.

A fuel cell system 1 includes at least one electricity generating element 3 that generates electrical energy through an electrochemical reaction of a fuel and an oxidant, a fuel supplier 5 for supplying a fuel to the electricity generating element 3, and an oxidant supplier 7 for supplying an oxidant to the electricity generating element 3. In addition, the fuel supplier 5 is equipped with a tank 9 that stores fuel, and a fuel pump 11 that is connected therewith. The fuel pump 11 supplies fuel stored in the tank 9 with a predetermined pumping power. The oxidant supplier 7, which supplies the electricity generating element 3 with an oxidant, is equipped with at least one pump 13 for supplying an oxidant with a predetermined pumping power.

The electricity generating element 3 includes a membrane-electrode assembly 17 that oxidizes hydrogen or a fuel and reduces an oxidant, separators 19 and 19' that are respectively positioned at opposite sides of the membrane-electrode assembly and supply hydrogen or a fuel, and an oxidant. At least one electricity generating element 3 is composed in a stack 15.

The following examples illustrate the present invention in more detail. However, it is understood that the present invention is not limited by these examples.

Preparation of a Fuel Cell Catalyst

Example 1

A mixed solution was prepared by adding a $H_2PtCl_6$ metal precursor to 400 ml of a mixed solvent including water and isopropyl alcohol in a volume ratio of 940:60 in a reactor. The $H_2PtCl_6$ metal precursor was added to the mixed solution in a concentration of 10.25 mM. In addition, 0.2 g of carbon nanotubes were added to the mixed solution. The resulting mixed solution was radiated with ions accelerated at 45 MeV with a current of 500 nA, fabricating a fuel cell catalyst (Sample 1).

In addition, another fuel cell catalyst (Sample 2) was fabricated in the same method as aforementioned.

Example 2

A mixed solution was prepared by adding a $H_2PtCl_6$ metal precursor to 400 ml of a mixed solvent including water and isopropyl alcohol in a volume ratio of 940:60 in a reactor. The $H_2PtCl_6$ metal precursor was added to the mixed solution in a concentration of 12.8 mM. Then, a fuel cell catalyst was prepared according to the same method as in Example 1 except for using the prepared mixed solution.

Example 3

A fuel cell catalyst was prepared according to the same method as in Example 1, except for radiating ions accelerated at 10 MeV with a current of 500 nA to the mixed solution.

Example 4

A fuel cell catalyst was prepared according to the same method as in Example 1, except for radiating ions accelerated at 100 MeV with a current of 500 nA to the mixed solution.

Example 5

A fuel cell catalyst was prepared according to the same method as in Example 1, except for radiating ions accelerated at 45 MeV with a current of 100 nA to the mixed solution.

Example 6

A fuel cell catalyst was prepared according to the same method as in Example 1, except for radiating ions accelerated at 45 MeV with a current of 10 μA to the mixed solution.

Example 7

A fuel cell catalyst was prepared according to the same method as in Example 1, except for radiating ions accelerated at 45 MeV with a current of 30 μA to the mixed solution.

Example 8

A fuel cell catalyst was prepared according to the same method as in Example 1, except for radiating ions accelerated at 45 MeV with a current of 50 μA to the mixed solution.

Examples 9 to 13

A fuel cell catalyst was prepared according to the same method as in Example 1, except for respectively heating a mixed solution of Example 1 at 56.1° C., 64° C., 61.8° C., 67.3° C., and 69.6° C., and then radiating ions thereto.

For the fuel cell catalyst of Examples 9 and 10, their reactions were complete within 1 minute after radiating ions to the mixed solution. For the fuel cell catalyst of Examples 11 to 13, their reactions were complete within 5 minutes after radiating ions to the mixed solution. Accordingly, when ions were radiated to the mixed solution after heating it at a temperature of 50 to 70° C., reduction of a metal was accelerated.

Example 14

A fuel cell catalyst was prepared according to the same method as in Example 1, except for radiating ions accelerated at 5 MeV with a current of 50 nA to the mixed solution.

Example 15

A fuel cell catalyst was prepared according to the same method as in Example 1, except for radiating ions accelerated at 110 MeV with a current of 60 µA to the mixed solution.

For the fuel cell catalyst of Examples 1 to 13, nano-sized platinum particles could be rapidly obtained. On the contrary, for the fuel cell catalyst of Examples 14 and 15, it took a longer time to obtained nano-sized platinum particles.

Comparative Example 1

Commercially-available Pt black (JM Co., Hispec1000) was used as a fuel cell catalyst.

Examination of Fuel Cell Catalysts with a Scanning Electronic Microscope

Figure 2A:
FIG. 2A and FIG. 2B are scanning electron microscope (SEM) photographs of fuel cell catalyst samples 1 and 2 according to Example 1.
Figure 2B:
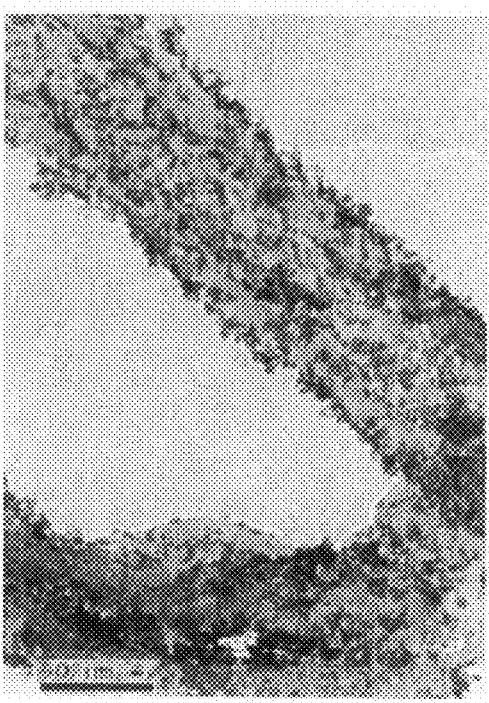

The fuel cell catalysts of Example 1 (Samples 1 and 2) were examined with a scanning electron microscope (SEM). The results are respectively shown in FIGS. 2A and 2B. Referring to FIGS. 2A and 2B, platinum nanoparticles supported on carbon nanotubes were identified. The platinum nanoparticles had a uniform nano-size.

X-ray Diffraction Analysis of Fuel Cell Catalysts

X-ray diffraction analysis was performed regarding the fuel cell catalysts of Example 1 (Samples 1 and 2). The results are shown in FIG. 3.

Figure 3:
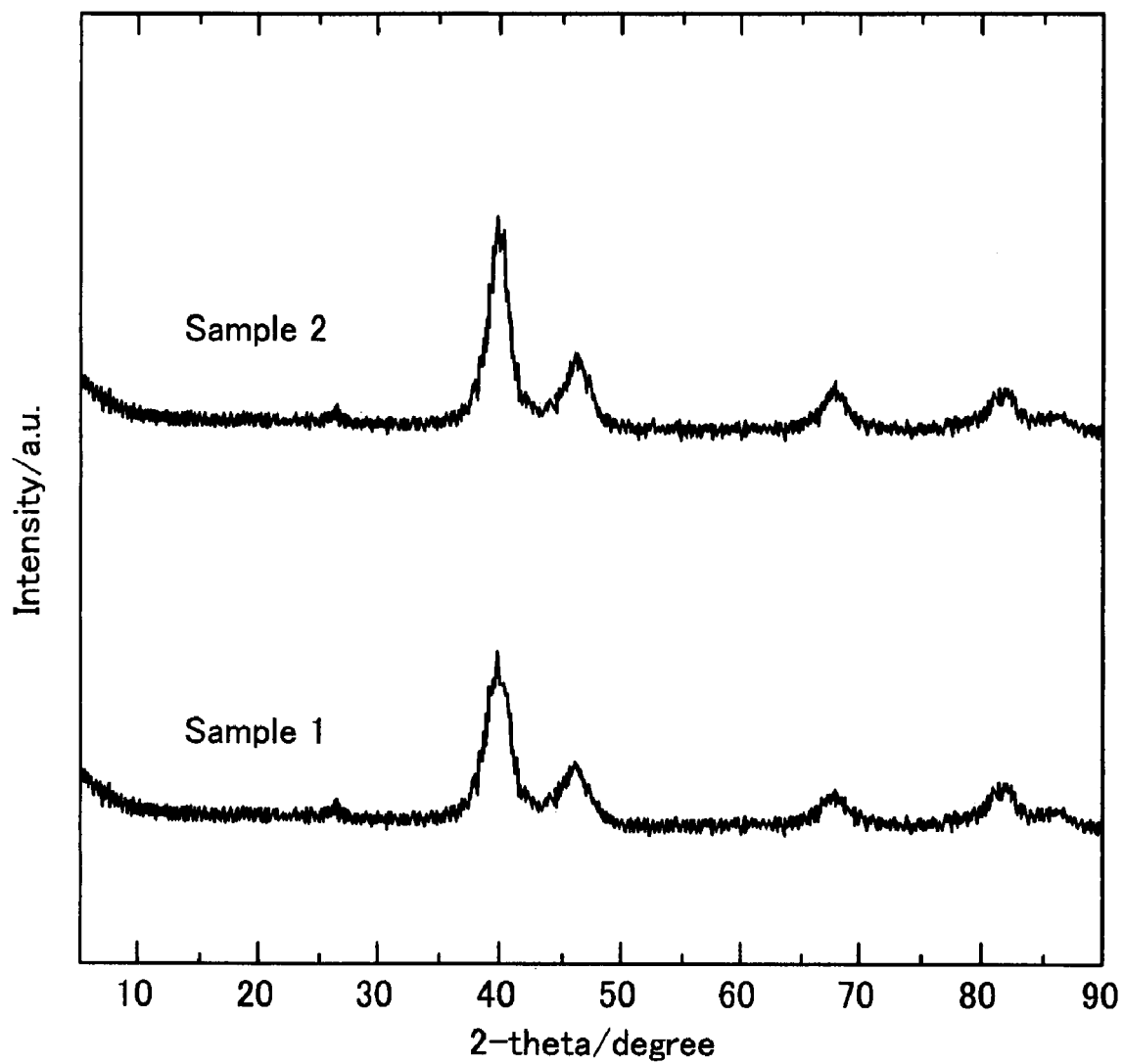
FIG. 3 shows X-ray diffraction analysis results of fuel cell catalyst samples 1 and 2 according to Example 1.

Referring to FIG. 3, both Samples 1 and 2 had a typical peak, which indicates that Pt in both Samples 1 and 2 were supported on carbon nanotubes. In addition, their peaks had similar shapes, showing that they had uniform metal nanoparticles.

Fabrication and Evaluation of a Fuel Cell

The fuel cell catalysts of Example 1 and Comparative Example 1 were respectively used as a cathode catalyst to prepare a cathode. Ru black was used as an anode catalyst to prepare the anode. Then, a Nafion polymer membrane (DuPont Co.) was positioned between the prepared cathode and anode, fired at 120° C. for 1 minute, and then hot-rolled, preparing a membrane-electrode assembly (MEA). The membrane-electrode assembly was interposed between two sheets of gaskets and also between two separators with a gas channel and a cooling channel having a predetermined shape, and then compressed between copper end plates, fabricating a single cell.

The single cell including the fuel cell catalyst of Example 1 as a cathode catalyst included 3 mg of platinum per unit cathode area. The single cell including the fuel cell catalyst of Comparative Example 1 as a cathode catalyst included 6 mg of platinum per unit cathode area.

The single cells were supplied with hydrogen and air, and thereafter estimated regarding voltage characteristics according to current density. In addition, they were measured regarding electric power density according to current density. The results are shown in FIG. 5.

Figure 4:
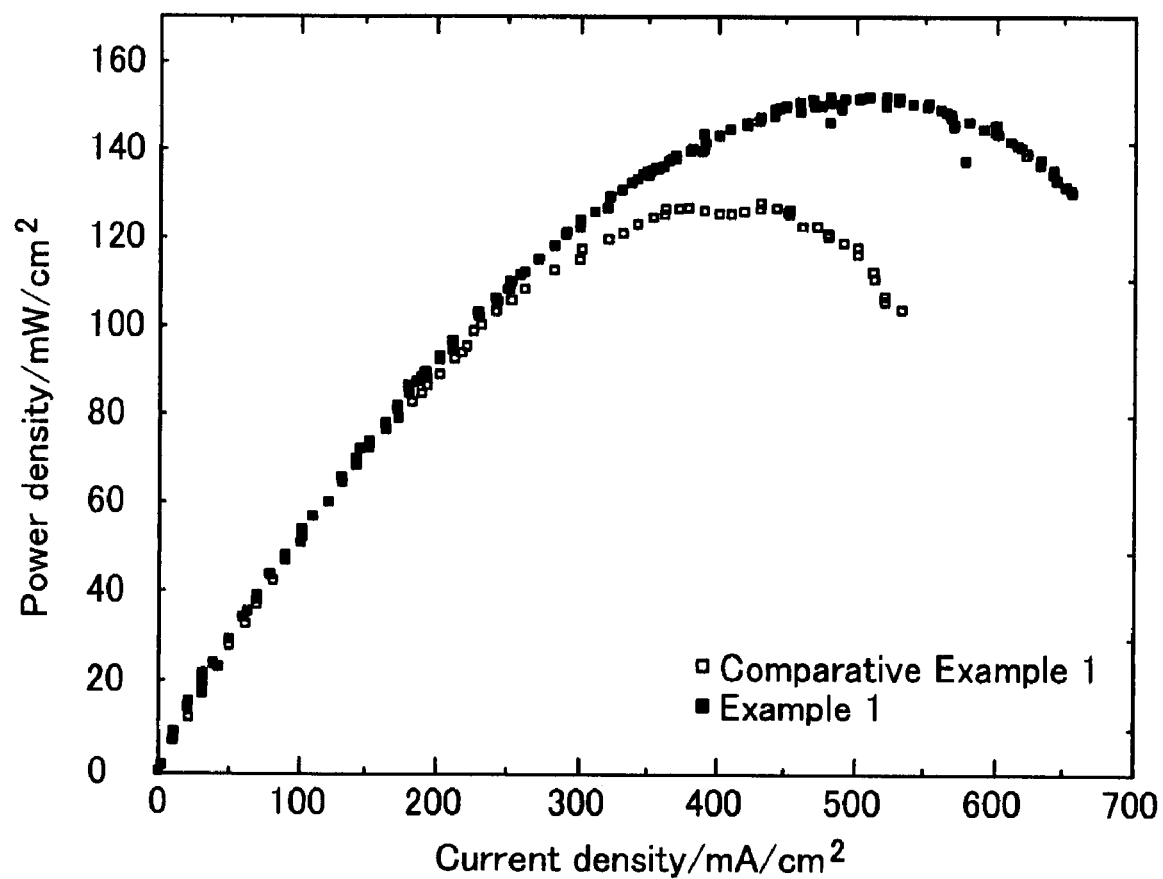
FIG. 4 and FIG. 5 are graphs showing performance of the fuel cells that include catalysts according to Example 1 and Comparative Example 1 as cathode catalysts.
Figure 5:
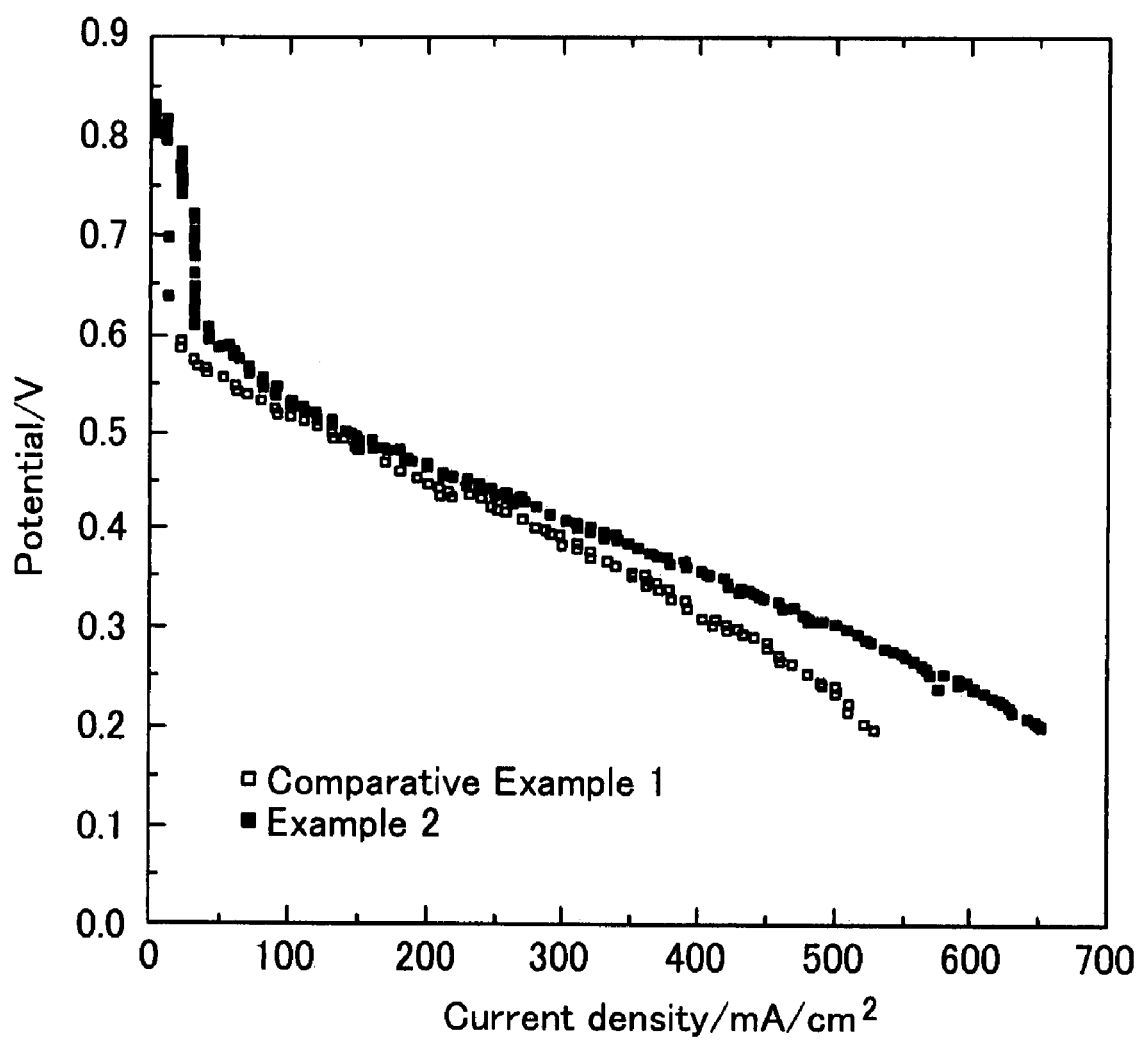

Referring to FIGS. 4 and 5, the single cell including the fuel cell catalyst of Example 1 resulted in much better electric power density and voltage characteristics according to current density than the one including the fuel cell catalyst of Comparative Example 1.

According to one embodiment of the present invention, a manufacturing method of preparing metal nanoparticles includes radiating an ion beam to a mixed solution. When metal nanoparticles are prepared by using an ion beam, its reaction speed can be controlled, resultantly contributing to producing uniformly-sized metal nanoparticles.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing metal nanoparticles, comprising:
    preparing a mixed solution by mixing a metal precursor with a solvent; and
    producing the metal nanoparticles by reducing the metal precursor by radiating the mixed solution with an ion beam radiated by accelerating ions to 10 MeV to 100 MeV with a current of 100 nA to 50 µA.

2. The method of claim 1, wherein the ions are accelerated to 20 to 70 MeV.

3. The method of claim 2, wherein the ions are accelerated to 30 to 60 MeV.

4. The method of claim 1, wherein the ions are radiated with a current of 500 nA to 10 µA.

5. The method of claim 4, wherein the ions are radiated with a current of 800 nA to 3 µA.

6. The method of claim 1, wherein the ions are hydrogen ions.

7. The method of claim 1, wherein the solvent is selected from a group consisting of water, alcohol, and combinations thereof.

8. The method of claim 7, wherein the alcohol is selected from a group consisting of isopropyl alcohol, methanol, ethanol, n-propyl alcohol, butanol, glycerol, ethylene glycol, and combinations thereof.

9. The method of claim 7, wherein the solvent and the alcohol are mixed in a volume ratio of 995 to 250:5 to 750.

10. The method of claim 9, wherein the solvent and the alcohol are mixed in a volume ratio of 970 to 500:30 to 500.

11. The method of claim 1, wherein the mixed solution comprises a metal precursor in a concentration of 30 mM to 1 mM.

12. The method of claim 11, wherein the mixed solution comprises a metal precursor in a concentration of 20 mM to 5 mM.

13. The method of claim 1, wherein the mixed solution further comprises a carrier.

14. The method of claim 1, wherein the mixed solution further comprises a dispersing agent.

15. The method of claim 14, wherein the dispersing agent is selected from a group consisting of tetrahydrofuran, glycerol, ethylene glycol, and combinations thereof.

16. The method of claim 1, wherein the metal is selected from a group consisting of platinum, iron, cobalt, nickel, and combinations thereof.

17. The method of claim 1, wherein the metal precursor is selected from a group consisting of $H_2PtCl_6$, $H_6Cl_2N_2Pt$, $PtCl_2$, $PtBr_2$, platinum acetylacetonate, $K_2[PtCl_4]$, $H_2Pt(OH)_6$, $Pt(NO_3)_2$, $[Pt(NH_3)_4]Cl_2$, $[Pt(NH_3)_4](HCO_3)_2$, $[Pt(NH_3)_4](OAc)_2$, $(NH_4)_2PtBr_6$, $(NH_3)_2PtCl_6$, and hydrates and combination thereof.

18. The method of claim 1, further comprising heating the mixed solution to 20 to 80° C. prior to said radiating with ions.

19. The method of claim 18, wherein the mixed solution is heated to 50 to 70° C. prior to said radiating with ions.

20. The method of claim 1, wherein the metal nanoparticles are a catalyst.

21. The method of claim 20, wherein the metal nanoparticles are a fuel cell catalyst.

* * * * *